United States Patent [19]

Matsuo et al.

[11] Patent Number: 4,897,124
[45] Date of Patent: Jan. 30, 1990

[54] ALUMINUM-ALLOY ROLLED SHEET FOR FORMING AND PRODUCTION METHOD THEREFOR

[75] Inventors: Mamoru Matsuo; Toshio Komatsubara, both of Fukaya, Japan

[73] Assignee: Sky Aluminium Co., Ltd., Tokyo, Japan

[21] Appl. No.: 213,737

[22] Filed: Jun. 30, 1988

[30] Foreign Application Priority Data

Jul. 2, 1987 [JP] Japan ................... 62-163899
Jul. 2, 1987 [JP] Japan ................... 62-163900
Jul. 3, 1987 [JP] Japan ................... 62-165422

[51] Int. Cl.$^4$ ............................................. C22F 1/04
[52] U.S. Cl. ................... 148/2; 148/11.5 A; 148/12.7 A; 148/415; 148/440
[58] Field of Search ............ 420/544, 546; 148/2, 148/11.5 A, 12.7 A, 415, 440

[56] References Cited

U.S. PATENT DOCUMENTS 4,174,232 11/1979 Lenz et al. .................... 148/2

FOREIGN PATENT DOCUMENTS 52-141409 11/1977 Japan .
53-103914 9/1978 Japan .
57-98648 6/1982 Japan .
59-39499 9/1984 Japan .
61-15148 4/1986 Japan .

Primary Examiner—R. Dean
Attorney, Agent, or Firm—Armstrong, Nikaido, Marmelstein, Kubovcik & Murray

[57] ABSTRACT

An Al-Si-Mg series aluminum-alloy rolled sheet for forming, having improved formability, corrosion-resistance, and weldability, essentially consisting of Si and Mg, whose contents are on and within the line connecting points A, B, C, D, E, and F of FIG. 1, except for the line FA, from 0.05 to 0.5% of Fe, and balance aluminum and unavoidable impurities, with the proviso that:

|    | Si (%) | Mg (%) |
|----|--------|--------|
| A: | 1.8    | 0.1    |
| B: | 2.5    | 0.1    |
| C: | 2.5    | 1.1    |
| D: | 1.2    | 1.1    |
| E: | 1.2    | 0.6    |
| F: | 1.8    | 0.6    |

13 Claims, 3 Drawing Sheets

ALUMINUM-ALLOY ROLLED SHEET FOR FORMING AND PRODUCTION METHOD THEREFOR

BACKGROUND OF INVENTION

1. Field of Invention

The present invention relates to an aluminum-alloy rolled sheet having improved corrosion-resistance and weldability, and to a production method therefor. Particularly, the present invention relates to an aluminum-alloy rolled sheet which is suitable for using in such applications as an automobile-body sheet, where strength is particularly required and paint is applied to the sheet and then baked, and also relates to a production method for the same.

2. Description of Related Arts

The most frequently used sheets for forming the body and the like of an automobile have heretofore been cold-rolled steel sheet. In recent years, however, in order to decrease the weight of an auotomobile, there has been considerations for using aluminum-alloy rolled sheets for the body sheets. The requirements of body sheets for an automobile are: excellent formability in press-forming, particularly excellent elongation and bulging-formability, as well as free from Lüder's marks during forming; and, high strength, particularly high strength after baking, to which the body sheet is necessarily subjected.

Various aluminum-alloy rolled sheets have been used for the shaped articles where strength is required. The principal kinds of such aluminum-alloy rolled sheets are classified as follows depending upon the alloy-components.

(A) Non-heat treatable type Al-Mg series alloys. They are 5052 alloy with 0 temper (2.2-2.8% of Mg, 0.15 to 0.35% of Cr, and the balance of Al and the unavoidable impurities) and 5182 alloy with 0 temper (0.20-0.50% of Mn, 1.0 to 5.0% of Mg, and balance of Al and unavoidable impurities).

(B) Heat treatable type series Al-Cu alloy. This is 2036 alloy with $T_4$ temper (2.2-3.0% of Cu, 0.1-0.4% of Mn, 0.3-0.6% of Mg, and the balance of Al and unavoidable impurities).

(C) Heat treatable type Al-Mg-Zn-Cu series alloys with $T_4$ temper. They are proposed in Japanese Unexamined Patent Publication Nos. 52-141409, 53-103914, and 57-98648. The Al-4.5 Mg-0.38Cu-1.46Zn-0.18 Fe-0.09Si series alloy explained in Nikkei New Material, 1986, 4-7, No. 8, pages 63-72, particularly page 64 belongs to this type.

(D) Heat treatable type Al-Mg-Si series alloys. They are 6009 alloy with $T_4$ temper (0.4-0.8% of Mg, 0.6-1.0% Si, 0.15-0.6% of Cu, 0.2-0.8% of Mn, and balance of Al and unavoidable impurities), and 6010 alloy with $T_4$ temper (0.6-1.0% of Mg, 0.8-1.2% Si, 0.15-0.6% of Cu, 0.2-0.8% of Mn, and balance of Al and unavoidable impurities). These alloys are proposed in Japanese Examined Publication No. 59-39499. This publication also proposes the material with $T_4$ or $T_6$ temper, which contains, one or more of Mn in an amount of 0.2-0.8%, Cr in an amount of 0.1-0.3%, and Zr in an amount of 0.05-0.15%, in addition to 0.4-1.2% of Si, 0.05-0.35% of Fe, and 0.1-0.6% of Cu. Japanese Examined Patent Publication No. 61-15148 proposes an alloy which is referred to as AC120 alloy and contains Si and Mg, whose content is within the four points, i.e., (a) 1% Si and 0.6% Mg, (b) 1.8% Si and 0.6% Mg, (c) 1.8% Si and 0.2% Mg, and (d) 1.2% Si and 0.2% Mg, as well as 0.3% or less of one or more of Cr, Mn, Zr, and Ti.

It is however difficult to satisfy all of the properties required for the body sheets of an automobile body by the above described conventional alloys.

The alloys of (A) have drawbacks in poor strength, Lüder's marks formed during the forming, and strength-reduction during the baking process. The alloy of (B) has drawbacks in insufficient formability and reduced strength during the baking process.

The alloys of (C) have insufficient formability, especially bendability, and reduced strength during paint baking process. The alloys of (D) have features in that the Lüder's marks do not generate and further the strength equivalent to that of cold-rolled steel sheets can be attained by baking. However, it is known that the elongation, which is an index of the formability, is considerably low.

Researches and studies have been made to provide aluminum-alloy rolled sheets which satisfy all of the following requirements of body sheets of an automobile body: excellent formability, particularly, excellent elongation and bulging formability, and free from Lüder's marks; high strength, particularly post-baking strength; excellent corrosion-resistance; and, excellent weldability.

In the Al-Si-Mg series alloys, to which the present invention belongs, there are known alloys satisfying the above requirements in a rather high extent. However, the requirements for the aluminum-alloy rolled sheets must be severe, since they are less advantageous than the cold-rolled steel sheets from a view point of cost. There has not yet been provided an aluminum-alloy rolled sheet which satisfies all of the requirements. Particularly, the low elongation of the conventional aluminum-alloy rolled sheet is disadvantageous from a view point of formability.

Regarding the corrosion-resistance of aluminum-alloy used for a body sheet of an automobile, there is heretofore an opinion that, since the corrosion-resistance of aluminum-alloy is superior to that of steel, no problem in the corrosion-resistance would arise provided that the paint coating has no defects (Nikkei New Material, ibid.). In addition, the corrosion-resistance failure due to a defect of chromium plating applied on an aluminum sheet, i.e., the swelling failure of the chromium-plating layer, is tested by CASS method (Japanese Examined Patent Publication No. 59-39499 mentioned above). Although this opinion contemplates the corrosion-resistance required for the aluminum-alloy rolled sheet for forming, the corrosion-resistance required is made clearer than heretofore. Namely, it is made clear that the corrosion-resistance of unpainted sheet and pitting-corrosion resistance are required for the aluminum alloy, and, further, the peeling of paint coating (blister) and filiform corrosion should not occur during long service period. An aluminum-alloy rolled sheet, which has excellent corrosion-resistance and, in which excellent strength and formability are combined, are unknown.

The body sheets of an automobile are welded by spot welding in most cases but are welded by so-called arc welding by TIG or MIG depending upon the parts thereof. Since the thickness of an arc-welded sheet is usually 2.0 mm or less and hence relatively thin, welding is generally speaking difficult. Good weldability by arc welding is therefore required for an aluminum-alloy rolled sheet.

The present invention is made under the background described in the foregoing.

SUMMARY OF INVENTION

It is an object of the present invention to provide an aluminum-alloy rolled sheet which exhibits: an excellent formability, particularly, excellent elongation and bulging formability, and free from Lüder's marks; strength increase after paint baking; excellent corrosion-resistance; and, excellent weldability.

It is another object of the present invention to provide a production process of the aluminum-alloy rolled sheet mentioned above.

Figure 1:
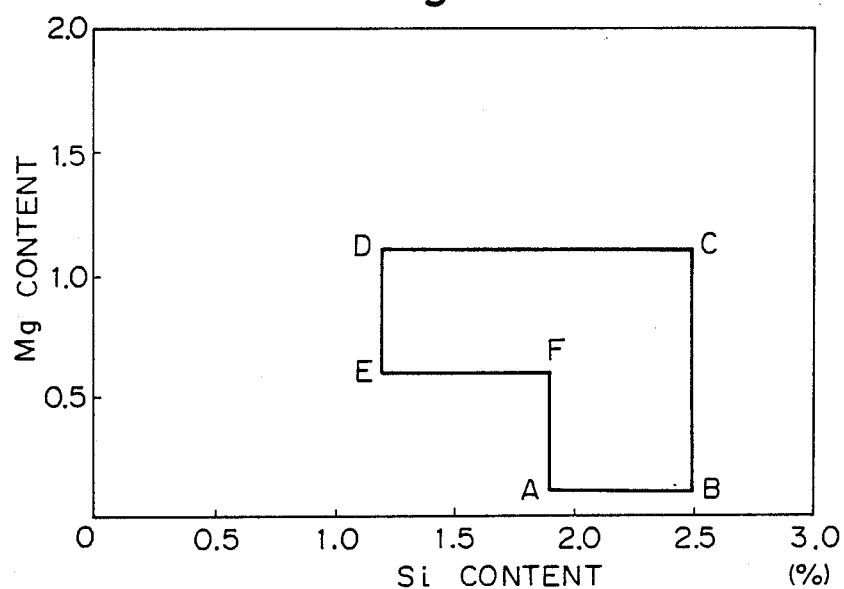
FIG. 1 is a graph illustrating the range of Mg and Si contents of the aluminum-alloy rolled sheet according to the present invention.

In accordance with the object of the present invention, there is provided an aluminum-alloy rolled sheet for forming having improved formability, corrosion-resistance, and weldability, consisting of Si and Mg, whose contents are on and within the line connecting points A, B, C, D, E, and F of FIG. 1, except for the line DEFAB, 0.05 to 0.5% of Fe, if necessary, at least one member selected from the group consisting of not more than 0.6% of Mn, not more than 0.3% of Cr, and not more than 0.3% of Zr, and balance of Al and unavoidable impurities, with the proviso that:

|   | Si (%) | Mg (%) |
|---|--------|--------|
| A: | 1.8 | 0.1 |
| B: | 2.5 | 0.1 |
| C: | 2.5 | 1.1 |
| D: | 1.2 | 1.1 |
| E: | 1.2 | 0.6 |
| F: | 1.8 | 0.6 |

In accordance with the objects of the present invention, there is also provided a production method of an aluminum-alloy rolled sheet, comprising the steps of: casting an alloy melt having the above mentioned composition by a semi-continuous casting or continuous casting; rolling the ingot or cast coil obtained to form a rolled sheet; solution-heat treating the rolled sheet at a temperature of from 450° to 590° C.; and, quenching at a cooling rate of not less than 5° C./sec.

The composition of aluminum-alloy rolled sheet according to the present invention is first described.

Si:

A part of Si is present as metallic particles in the Al alloy and enhances the formability, particularly the elongation. The other part of Si is co-present together with Mg and form $Mg_2Si$ which contributes to strength-enhancement due to precipitation thereof. It is particularly important for strength enhancement that the quantity of Si is sufficiently excessive than the stoichiometric quantity for forming $Mg_2Si$, thereby yielding the metallic Si particles. In addition, Si improves the arc-weldability, such as TIG and MIG-weldability, although the function of Si in arc welding is not clear. These effects of Si for improving the strength, formability, and weldability are insatisfactory at the Si content of less than 1.8% in a case of from 0.1 to 0.6% of Mg and Si content of less than 1.2% in a case of from 0.6 to 1.1% of Mg. When the Si content exceeds 2.5%, although weldability is not impaired, but the quantity of Si increases so that the formability, particularly the bending property is impaired.

Incidentally, it has heretofore been recognized in the art of an Al-Si-Mg series alloy rolled sheet for forming that the formability is reduced with the increase in Si content to 1.8% or more. In fact, there is a general tendency that the formability is reduced with an increase in the Si content and hence in the quantity of $Mg_2Si$. It turned out, however, that the elongation and bending radius can be improved, while maintaining the Erichsen value, limitative drawing ratio (LDR), and the like at an almost same level as the case of less than 1.8% of Si, by means of increasing the relative quantity of excessive Si and, hence increasing the ratio of metallic Si particles relative to the $Mg_2Si$ particles.

The excessive quantity of Si ($\Delta Si$) is expressed by the following formula.

$$\Delta Si = Si(wt\ \%) - 0.58\ Mg(wt\ \%)$$

A good formability is obtained at $\Delta Si = 1.2-2.4$, particularly 1.2-1.8.

Mg:

Mg forms, as is described above, $Mg_2Si$ when copresent with Si and imparts strength to aluminum-alloy. When the Mg content is less than 0.1% (in a case of 1.8% or more of Si) and less than 0.6% (in a case of 1.8% or less of Si), the strength is unsatisfactory. On the other hand, when the Mg content exceeds 1.1%, the elongation is low.

Fe:

Fe refines the crystal grains of aluminum sheet and hence contributes to the strength-enhancement. When the Fe content is less than 0.05%, grain coarsening occurs. On the other hand, when the Fe content exceeds 0.5%, formability is low. The Fe content is therefore from 0.05 to 0.5%.

Mn, Cr, and Zr:

Each of these elements refines the recrystallized grains and stabilizes the recrystallization structure, as well as enhances the formability. These effects are not satisfactory at the Mn content less than 0.05%, Cr content less than 0.05%, and Zr content less than 0.05%. It is therefore necessary to add at least 0.05% of these elements in order to positively utilize the effects thereof. On the other hand, at the Mn content exceeding 0.6%, the formability is low. At the Cr content exceeding 0.3% and Zr content exceeding 0.3%, coarse intermetallic compounds are formed. The contents of Mn, Cr, and Zr are therefore 0.6% or less, 0.3% or less, and 0.3% or less, respectively. Mn, Cr and Zr are effective for refining the recrystallized grains. However, in order to obtain the fine recrystallized grains, these elements are unnecessary, provided the heating rate in the solution heat-treatment is 5° C./sec or more.

The balance of the above components is Al and unavoidable impurities. Since Cu among the impurities seriously impairs corrosion-resistance, the Cu content is limited to less than 0.1%. Incidentally, a trace amount of Ti, or Ti and B are added to the ordinary aluminum alloys so as to refine the crystal grains of an ingot. A trace amount of Ti or Ti and B may also be added into the aluminum-alloy rolled sheet of present invention as the balance of Al, alloying components, and unavoidable impurities. The Ti should be within the range of from 0.01 to 0.15%, since at a content of less than 0.01% the effects of Ti are not obtained, and at a content of more than 0.15%, primary $TiAl_3$ crystallizes to impair the formability. The B, which may be added together with Ti, should be within the range of from 1 to 500 ppm, since at a content of less than 1 ppm the effects of B are not attained, and at a content more than 500 ppm coarse particles of $TiB_2$ are incorporated in the precipitates to impair the formability.

Next, the production method of an aluminum-alloy rolled sheet according to the present invention is described.

In order to fully demonstrate the properties of the alloy composition as described above, it is necessary that the aluminum-alloy rolled sheet is solution heat-treated at a temperature of from 450° to 590° C. and then cooled at a cooling rate of not less than 5° C./sec. The solute Mg and Si which are necessary for providing the strength are obtained by this solution treatment. When the solution temperature is lower than 450° C., the solution is unsatisfactory for obtaining the $T_4$ strength and post-baking strength. On the other hand, when the solution temperature exceeds 590° C., there is a danger of melting of the eutectic components. When the quenching rate (cooling rate) is slower than 5° C./sec, not only is the strength unsatisfactory but also the resistance against the corrosion, e.g., the intergranular corrosion, is impaired.

Desirably, the production process under the following methods and conditions should be carried out in order to further enhance the properties of the alloy composition.

The casting speed of an alloy-melt having the above mentioned composition, when pouring the melt into a mold having a rectangular cross section by semi-continuous casting, is not limited at all, provided that a rectangular ingot is obtained by casting. However, the casting speed is usually in the range of from 25 to 250 mm/min. Prior to hot-rolling, this ingot is heated at a temperature of from 450° to 590° C. for 1 hour to 48 hours, in order to eliminate inhomogenity and to improve the workability of the ingot. When the heating temperature is lower than 450° C. or when the heating time is shorter than 1 hour, homogenization is unsatisfactory. When the heating temperature is higher than 590° C., local melting may occur. The heating time exceeding 48 hours is not economical at all and the homogenizing effect saturates at such a long heating time.

Instead of a large-sized semi-continous casting ingot, a continuously cast sheet, which is obtained by continuously feeding melt between the two rolls, may be formed. In this case, the casting speed is not limited at all, and usually, cold-rolling is carried out, without applying hot-rolling. A preliminary heating prior to cold-rolling at a temperature of from 300° to 590° C. for 1 to 48 hours is advisable for promoting the homogenity of the sheet.

The hot-rolled aluminum-alloy rolled sheet is then cold-rolled to reduce the sheet thickness to 0.5 to 3.0 mm. When intermediate annealing is interposed between the successive cold-rolling processes or between the hot- and cold-rolling processes, the recrystallization in the intermediate annealing step effectively enhances the strength and formability. More specifically, when coarse grains are generated during hot-rolling, and if the hot-rolled sheet is cold-rolled and then solution-treated without intermediate annealing, band structure elongated in the rolling direction is formed. This band structure causes, during the forming, undulation which is referred to as ridging or flow line, and which impairs the appearance of the formed articles. It is possible by means of recrystallization induced by intermediate annealing to eliminate detrimental effects of coarse crystals formed at hot-rolling. When the temperature of intermediate annealing is less than 280° C., recrystallization does not occur. On the other hand, the temperature is more than 450° C., the coarsening of crystals is liable to occur. The intermediate annealing at a holding time longer than 48 hours is not economical.

Regarding the solution heat-treatment, the continuous solution heat-treatment and quenching of a coil is desirable in the light of mass productivity. The holding time is at least zero second (immediate cooling at the same time as the arrival at solution temperature) and 5 minutes at the longest. The longest holding time of a coil at the holding temerature in a continuous solution and quenching furnace is 5 minutes in the light of economy. Since the heating rate of 5° C./sec or more is usually obtained in the continuous solution and quenching furnace, the crystal grains are refined and formability is enhanced.

Next, the incomplete solution heat-treatment, which is one of the production conditions in the present invention and which is applied only for the Mg content exceeding 0.6%, is described. The solution heat-treatment aims originally to satisfactorily redissolve the strengthening elements, i.e., Si and Mg, into solid solution. Accordingly, in order to obtain the requisite strength, the so-called complete solution treatment is carried out to obtain satisfactory quantity of solute Si and Mg. However, in a case of an automobile body, importance is attached to the formability rather than strength depending upon the parts of a body. In this case, the Mg content is set as high as 0.6% or more, and only a part of Mg sufficient for obtaining the strength can be dissolved in a solid solution, that is, an incomplete solid solution can be carried out. Specifically, the solution heat-treatment is carried out at a low temperature or for a short period of time. In the case of using a continuous solution heat-treating and quenching furnace, the short holding time makes it possible to enhance the line speed of a sheet, which is economically advantageous. The fluctuation of states of Mg and Si, which may occur in an aluminum-alloy rolled sheet prior to the solution heat-treatment, causes a variation in the re-dissolving quantity of Mg and Si in the incomplete solution treatment, with the result that the mechanical properties are also varied. It is therefore important to attain the constant states of Mg and Si prior to the solution treatment. In order to control the states of Mg and Si prior to solution treatment, it is necessary to strictly control the heating condition prior to hot-rolling and hot-rolling conditions. However, it is desirable that intermediate annealing is interposed as described above. When an aluminum-alloy rolled sheet is subjected to intermediate annealing as described above, the states of Mg and Si, which have been determined by the heat history prior to the intermediate annealing, are stabilized and made constant. This leads to constant re-dissolving quantity of Mg and Si during the incomplete solution-treatment, and hence to easiness in the stabilization of mechanical properties.

Since an aluminum-alloy rolled sheet is rapidly heated and rapidly quenched during the solution treatment, abrupt thermal expansion and shrinkage are caused in the rolled sheet. As a result, the rolled sheet is deformed to generate the strain or distortion. The strain or distortion is hereinafter referred to as the distortion. In order to eliminate the distortion, the rolled sheet is subjected to straightening after solution heat-treatment. This may be any one of levelling, tension-levelling, skin-passing, stretching, and the like. By any of these methods, distortion can be removed by imparting cold-working to some extent. The degree of cold-working during the straightening varies depending upon the degree of distortion after quenching but is such that the yield strength is increased by 1 kg/mm$^2$ or more and the formability is impaired in terms of Erichsen value by 0.2 mm or more.

The rolled sheet which has been subjected to the distortion straightening step and which exhibits a reduced formability is subjected to the final heat treatment, in which the sheet is heated to a temperature of from 60° to 360° C., held at this temperature, then cooled, or heated to the above temperature followed by immediate cooling. This heat treatment consists of: temperature-elevating at a heating rate within the hatched region, i.e., the straight lines or curve connecting the points A, B, C, D, and E of FIG. 2, holding, in accordance with the holding temperature, the time within the hatched region, i.e., the straight lines or curve connecting the points a, b, c, and d of FIG. 3 and the region surrounded thereby, and, cooling at a cooling rate, in accordance with the heating temperature, within the hatched region of FIG. 2.

Figure 2:
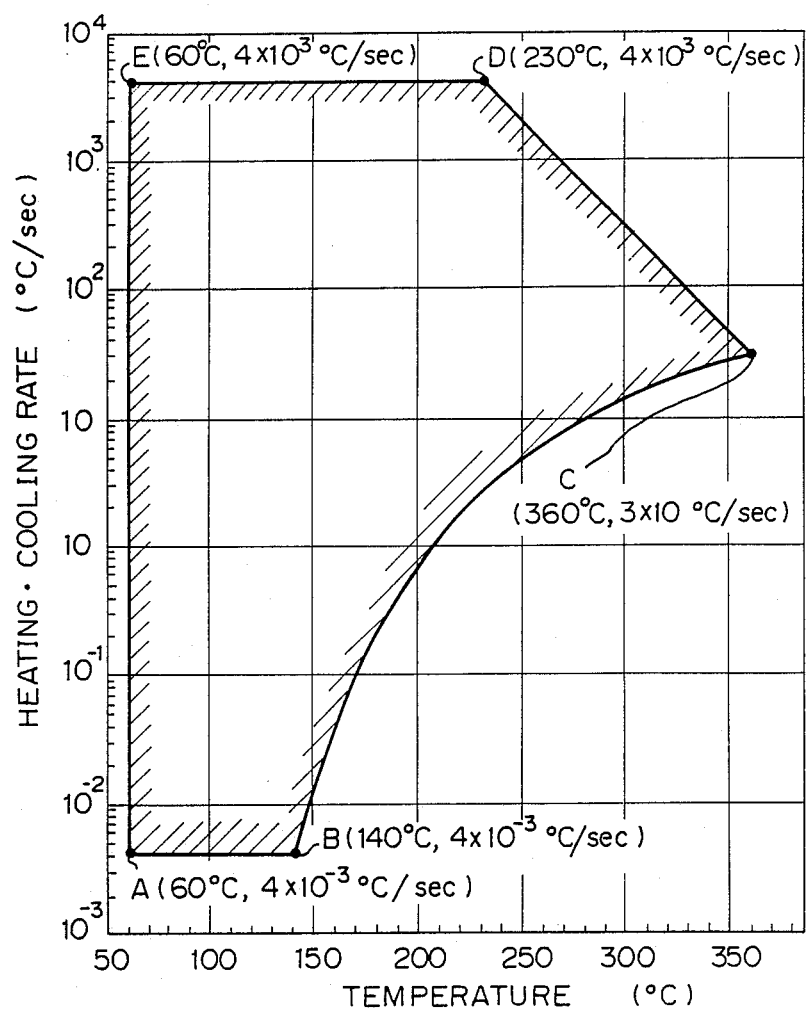
FIG. 2 is a graph showing the appropriate range of heating temperature and heating rate as well as cooling temperature and cooling rate in the final heat treatment after straightening.

The points A through E in FIG. 2 indicate the following temperatures and heating or cooling rates.

A: 60° C., $4\times10^{-3}$ °C./sec.
B: 140° C., $4\times10^{-3}$ °C./sec
C: 360° C., $3\times10$ °C./sec
D: 230° C., $4\times10^3$ °C./sec
E: 60° C., $4\times10^3$ °C./sec The points a through d in FIG. 3 indicate the following temperatures and holding times.

a: 200° C., 0 sec
b: 360° C., 0 sec
c: 130° C., $10^5$ sec
d: 60° C., $10^5$ sec The reasons for determining the heating rate, holding time, and cooling rate of the final heat treatment after distortion-straightening, as above, are explained.

Since the Al-Si-Mg series aluminum alloy according to the subject alloy of the present invention is heat treatable, not only is the work strain removed but also the age-hardening may occur during heating, holding and cooling. In such cases, there are dangers of decrease in the formability due to strengthening and decrease in the post-baking strength or post-T$_6$ strength due to overaging. It is, therefore, necessary to relieve the work strain, in the distortion-straightening step while avoiding the dangers described in the foregoing. It is also necessary to maintain the flatness attained by straightening. Also, the economics of the process must be considered. The respective ranges are determined in the light of the foregoing points.

Heating Rate

Below the straight line AB, no problems arise as far as the properties of the material are concerned. But, slower heating than the line AB necessitates an extremely long time for the temperature elevation, which is not at all economical. The heating rate is therefore above the straight line AB.

In a slow heating-rate region below the line BC, precipitation occurs during the temperature elevation and thus formability is reduced. The region above the curve BC is therefore set.

Next, in the region above the straight line DC, heating is very rapid in a high temperature region, causing the generation of distortion and thus, losing the straightening effect, during the temperature-elevation. Accordingly, the region below the straight line DC is set.

In the region above the line DE, heating is more rapid than heating caused by loading a sheet into an oil bath. Although such heating is effective, it is impractical and insignificant. Accordingly, the region below the straight line DE is set.

In a region left to the straight line EA, i.e., where the heating temperature is lower than 60° C., the work hardening due to straightening cannot be relieved, no matter how the heating rate is. Accordingly, the region to the left of the straight line EA is excluded, so as to set 60° C. or more.

The heating rate varies depending upon the heating, holding temperature, but must lie within the hatched region surrounded by the points A, B, C, D, and E in FIG. 2, as is described above.

Holding Temperature and Time

Figure 3:
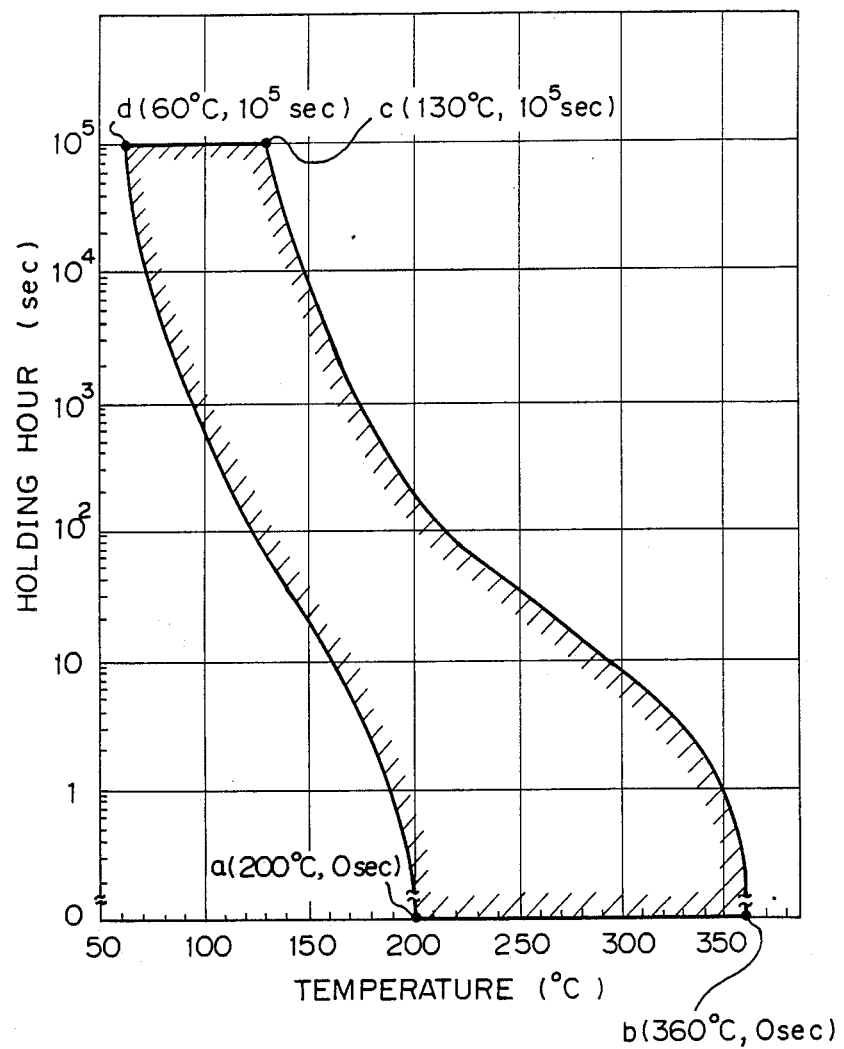
FIG. 3 is a graph showing the appropriate range of holding temperature and time.

Regarding the straight line ab in FIG. 3, when the holding temperature is from 200° to 360° C., the working hardening can be relieved, even in a case where, upon arrival at the holding temperature, cooling is immediately initiated with a zero holding time, as illustrated by the line ab. Accordingly, the lower limit of the holding time is zero second, i.e., on the line ab, provided that the holding temperature is from 200° to 360° C.

In addition, in a region above and to the right of the curve bc, the work-hardening can be relieved but strength increases due to high-temperature aging to impair the formability. In addition, in a high-temperature region, the overaging occurs to impair the formability and the strength required is not obtained by the paint baking or T$_6$ treatment after forming. Accordingly, the region below and to the left of the curve bc needs to set.

In a region above the straight line cd, the working hardening can be relieved to restore the formability but the holding time exceeds 24 hours, which is economically insignificant. Accordingly, the region is set below the straight line cd.

In a region below or to the left of the curve da, the heat necessary for relieving the work hardening is not imparted and an appreciable recovery of the formability is not attained.

Accordingly, the region above and to the right of curve da needs to be set.

The heating holding time varies depending upon the heating holding temperature but must lie within the hatched region surrounded by the points a, b, c, and d in FIG. 3.

Cooling Rate

The cooling rate must lie, as must also the heating rate, within the hatched region surrounded by the points A, B, C, D, and E in FIG. 2.

Below the straight line AB, no problems arise as far as the properties of the material are concerned. But the slow cooling on or below the line AB necessitates an extremely long cooling time, which is not economical. Accordingly, the region above the straight line AB is set. In a region with slow cooling rate below the curve BC, precipitation due to aging is caused during cooling to impair formability. In addition, overaging is caused, with the result that the strength required cannot be obtained by paint baking or $T_6$ treatment after forming. Accordingly, the region above the curve BC is set. When the cooling rate is above the line CD, the cooling rate is very rapid, which also causes distortion due to thermal stress and thus a loss of the effects of straightening prior to the final heat treatment. Accordingly, the region below the straight line EF is set. In a region above the line DE, since the cooling rate essentially exceeds that of water cooling, which is practically insignificant, the cooling rate below the line DE is set.

Left of the line EA, the work hardening cannot be removed no matter how the cooling rate is. Accordingly, the region to the right of the straight line EA is set.

Accordingly, as also in the case of heating rate, the cooling rate varies depending upon the heating holding temperature but lies within the hatched region surrounded by A, B, C, D, and E in FIG. 2.

When the final heat treatment is carried out after the distortion-straightening step, the work hardening induced in this step is relieved to restore the formability, particularly the bulging-formability reduced by straightening. Excellent formability, particularly bulging-formability attained in a T4 tempering after the solution heat-treatment and quenching treatment, can also be restored.

In addition, since an appropriate condition is determined such that neither aging-precipitation nor overaging are caused during heat treatment, formability is not reduced thereby, and the strength required is obtained by paint baking or $T_6$ treatment after forming. Furthermore, distortion is not generated again and the improved flatness obtained by the preceeding straightening is maintained during the heat treatment.

The typical properties of aluminum-alloy rolled sheet according to the present invention, which sheet contains more than 1.8% of Si and has undergone the solution treatment and then natural aging (T4), are as follows.

Mechanical properties: Yield strength($\sigma_{0.2}$)-13 kg/mm$^2$ or more; tensile strength ($\sigma_B$)-approximately 26 kg/mm$^2$ or more; and, elongation-approximately 30% or more.

Formability: Erichsen value-equivalent or superior to 6009 and 6010 alloys; minimum bending (180°)-equivalent or superior to 5182 and 6009 alloys; limitative drawing ratio (LDR)-equivalent to the conventional aluminum-alloy rolled sheets for forming; and, Lüder's marks-free.

Baking hardenability: Equivalent or superior to 6009 alloy. Yield strength-increase of approximately 1 kg/mm$^2$ to 2 kg/mm$^2$, when subjected to cold-working at a degree of 10% or less and heat treatment at 175° C. for 1 hour. This cold working simulates the practical forming precess.

Corrosion Resistance: Superior to 6009 and 6010 alloys and equivalent to 5182 alloys, with regard to a sheet having the ordinary, three-layer coating for an automobile body, consisting of the electro-deposited, under, intermediate, and top coating.

Weldability: Better than the conventionally TIG or MIG welded sheet, e.g., a 6009 alloy sheet.

The typical properties of aluminum-alloy rolled sheet according to the present invention, which sheet contains 1.8% or less of Si and has undergone the solution treatment and then natural aging (T4), are as follows.

Mechanical properties: Yield strength($\sigma_{0.2}$)-15 kg/mm$^2$ or more; Tensile strength ($\sigma_B$)-approximately 29 kg/mm$^2$ or more; and, elongation-approximately 29% or more.

Formability: Erichsen value-equivalent or superior to 6010 alloys; minimum bending (180°)-equivalent or superior to 6010 alloy; limitative drawing ratio (LDR)-equivalent to the conventional aluminum-alloy rolled sheets for forming; and, Lüder's marks-free.

Baking hardenability: Yield strength-increase of approximately 1 kg/mm$^2$ from 2 kg/mm$^2$, when subjected to cold-working at a degree of 10% or less and heat treatment at 175° C. for 1 hour. This cold-working simulates the practical forming process. Equivalent or superior to 6010 alloy.

Corrosion Resistance: Superior to 6010 alloy and equivalent to 5182 alloys, with regard to a sheet having the ordinary, three-layer coating for an automobile body, consisting of the electrodeposited, under, intermediate, and top coating.

Weldability: Better than the conventionally TIG or MIG welded sheet, e.g., a 6009 alloy sheet.

In the aluminum-alloy rolled sheet for forming, according to the present invention, the properties for use as the sheet as body sheet of an automobile are well balanced as compared with the conventional rolled sheets.

The present invention is hereinafter described with reference to the Examples.

EXAMPLE 1

The Al alloy melts having the compositions of Table 1 were cast by semi-continous casting (DC casting) into slabs, 500 mm×1000 mm in cross-section, at a casting speed of 60 mm/min. These slabs were subjected to homogenizing given in Table 2, followed by hot-rolling to a thickness of 4 mm, and further cold-rolling to obtain 1 mm thick rolled sheets. Finally, the heat treatment given in Table 2 was carried out.

After the final heat treatment given in Table 2, the exposure at room temperature was carried out for 7 days. The mechanical properties and formability then measured are shown in Table 3. In Table 4, the strength after cold-working and heat treating is shown. The cold-working at a degree of 5% and 10% was carried out by stretching which simulates forming process. The heat treatment, which simulates paint-baking, was carried out at 175° C. for 1 hour. The strength after heat treatment is shown in Table 4. The yield strength and tensile strength are indicated by kg/mm$^2$, the elongation is indicated by %, and the Erichsen value and minimum bending are indicated by mm.

TABLE 1

Chemical Composition of Tested Alloys

| Alloy No. | Si | Mg | Cu | Fe | Mn | Zn | Cr | Zr | Ti | B | Remarks |
|---|---|---|---|---|---|---|---|---|---|---|---|
| 1 | 2.10 | 0.32 | Tr | 0.15 | 0.07 | — | — | — | 0.01 | 0.0001 | |
| 2 | 1.91 | 0.58 | 0.01 | 0.17 | 0.02 | — | 0.10 | — | 0.01 | 0.0001 | |
| 3 | 2.32 | 0.40 | Tr | 0.15 | — | — | — | 0.10 | 0.01 | 0.0001 | |
| 4 | 1.90 | 0.72 | 0.02 | 0.17 | 0.05 | — | 0.05 | — | 0.01 | — | |
| 5 | 2.20 | 0.91 | Tr | 0.20 | — | — | 0.11 | — | 0.02 | 0.0002 | |
| 6 | 1.90 | 1.02 | 0.05 | 0.15 | — | — | — | 0.05 | 0.01 | 0.0001 | |
| 7* | 1.13 | 0.90 | Tr | 0.15 | 0.17 | — | 0.05 | — | 0.01 | 0.0001 | |
| 8* | 2.12 | 0.45 | 0.50 | 0.17 | — | — | 0.13 | — | 0.01 | 0.0001 | |
| 9* | 1.35 | 0.90 | 0.35 | 0.20 | 0.05 | — | — | — | 0.01 | 0.0002 | |
| 10* | 0.72 | 0.92 | 0.50 | 0.20 | — | — | 0.07 | — | 0.01 | 0.0002 | |
| 11* | 1.35 | 1.51 | Tr | 0.20 | — | — | 0.09 | — | 0.01 | 0.0002 | |
| 12+ | 0.09 | 4.53 | 0.03 | 0.21 | 0.35 | — | — | — | 0.02 | 0.0001 | 5182 |
| 13+ | 0.30 | 0.35 | 2.31 | 0.20 | 0.24 | — | — | — | 0.02 | 0.0004 | 2036 |
| 14+ | 0.68 | 0.47 | 0.31 | 0.25 | 0.28 | — | — | — | 0.03 | 0.0002 | 6009 |
| 15+ | 0.09 | 4.45 | 0.20 | 0.17 | 0.10 | 1.43 | — | — | 0.01 | 0.0002 | ** |
| 16+ | 0.86 | 0.85 | 0.29 | 0.20 | 0.24 | — | — | — | 0.03 | 0.0002 | 6010 |

The asterisked (*) samples are comparative. The samples with the + marks are conventional. The sample 15(**) corresponds to Al—Mg—Zn—Cu.

TABLE 2

Heat Treatment

| | Homogenizing Treatment | Final Heat Treatment |
|---|---|---|
| Inventive | | |
| 1 | 530° C. × 10 Hr | 530° C. × 15 minutes water quenching |
| 2 | 530° C. × 10 Hr | 530° C. × 15 minutes water quenching |
| 3 | 530° C. × 10 Hr | 530° C. × 15 minutes water quenching |
| 4 | 530° C. × 10 Hr | 530° C. × 15 minutes water quenching |
| 5 | 530° C. × 10 Hr | 530° C. × 15 minutes water quenching |
| 6 | 530° C. × 10 Hr | 530° C. × 15 minutes water quenching |
| Comparative | | |
| 7 | 530° C. × 10 Hr | 530° C. × 15 minutes water quenching |
| 8 | 530° C. × 10 Hr | 530° C. × 15 minutes water quenching |
| 9 | 530° C. × 10 Hr | 530° C. × 15 minutes water quenching |
| 10 | 530° C. × 10 Hr | 530° C. × 15 minutes water quenching |
| 11 | 530° C. × 10 Hr | 530° C. × 15 minutes water quenching |
| Conventional | | |
| 12 | 530° C. × 10 Hr. | 350° C. × 2 Hr slow cooling (0 temper) |
| 13 | 530° C. × 10 Hr. | 500° C. × 15 minutes water quenching |
| 14 | 530° C. × 10 Hr. | 530° C. × 15 minutes water quenching |
| 15 | 530° C. × 10 Hr | 530° C. × 15 minutes water quenching |
| 16 | 530° C. × 10 Hr | 530° C. × 15 minutes water quenching |

Remarks: The cooling rate at the water quenching was approximately 1000° C./sec.

TABLE 3

Mechanical Properties and Formability

| Samples | Yield Strength ($\sigma 0.2$) | Tensile Strength ($\sigma B$) | Elongation ($\delta$) | Erichsen Value (Er) | Minimum Bending (180°) | Limitative Drawing Ratio (LDR) | Luders Marks |
|---|---|---|---|---|---|---|---|
| Inventive | | | | | | | |
| 1 | 13.5 | 26.2 | 30 | 9.7 | 0.3 | 2.19 | no |
| 2 | 14.8 | 27.2 | 29 | 9.5 | 0.5 | 2.17 | no |
| 3 | 14.0 | 27.0 | 29 | 9.5 | 0.5 | 2.19 | no |
| 4 | 15.3 | 30.8 | 29 | 9.2 | 0.7 | 2.15 | no |
| 5 | 16.3 | 32.1 | 29 | 9.0 | 0.7 | 2.18 | no |
| 6 | 16.8 | 33.8 | 29 | 9.2 | 0.7 | 2.18 | no |
| Comparative | | | | | | | |
| 7 | 19.3 | 32.1 | 27 | 8.5 | 1.5 | 2.07 | no |
| 8 | 15.1 | 28.2 | 29 | 9.6 | 0.5 | 2.19 | no |
| 9 | 17.1 | 32.1 | 29 | 9.3 | 0.7 | 2.15 | no |
| 10 | 16.7 | 32.2 | 27 | 8.9 | 1.2 | 2.15 | no |
| 11 | 19.2 | 33.8 | 26 | 8.5 | 1.5 | 2.01 | no |
| Conventional | | | | | | | |
| 12 | 14.5 | 29.8 | 28 | 9.5 | 0.5 | 2.19 | yes |
| 13 | 18.6 | 33.3 | 25 | 8.7 | 1.0 | 2.11 | no |
| 14 | 12.7 | 23.3 | 26 | 9.5 | 0.5 | 2.17 | no |
| 15 | 15.9 | 31.4 | 29 | 9.3 | 0.5 | 2.14 | no |
| 16 | 16.0 | 31.3 | 27 | 9.0 | 0.7 | 2.17 | no |

TABLE 4

| Samples | Pre-working Strength | | Bake Hardenability | | | | | | | | | |
|---|---|---|---|---|---|---|---|---|---|---|---|---|
| | | | Post cold-working (simulated forming)strength | | | | Post heat-treatment (175° C. × 1Hr, simulated paint baking)strength | | | | | |
| | Tensile Strength 0% | Yield Strength 0% | Tensile Strength 5% | Yield Strength 5% | Tensile Strength 10% | Yield Strength 10% | Tensile Strength 0% | Yield Strength 0% | Tensile Strength 5% | Yield Strength 5% | Tensile Strength 10% | Yield Strength 10% |
| Inventive | | | | | | | | | | | | |
| 1 | 26.2 | 13.5 | 28.3 | 23.3 | 29.3 | 28.4 | 27.1 | 16.1 | 30.4 | 25.6 | 31.3 | 27.8 |
| 2 | 27.2 | 14.8 | 29.1 | 24.1 | 30.1 | 27.6 | 28.3 | 17.8 | 31.1 | 26.8 | 32.3 | 27.3 |
| 3 | 27.0 | 14.0 | 29.1 | 23.8 | 30.0 | 29.2 | 28.1 | 17.7 | 30.8 | 27.4 | 31.5 | 29.0 |
| 4 | 30.8 | 15.3 | 32.9 | 24.8 | 33.0 | 30.0 | 31.8 | 18.9 | 35.0 | 27.9 | 35.1 | 30.2 |
| 5 | 32.1 | 16.3 | 33.9 | 26.3 | 34.8 | 31.3 | 32.7 | 20.5 | 35.9 | 29.1 | 36.3 | 29.2 |
| 6 | 33.8 | 16.8 | 35.6 | 26.5 | 36.2 | 31.5 | 34.8 | 20.8 | 37.6 | 30.5 | 38.7 | 31.5 |
| Comparative | | | | | | | | | | | | |
| 7 | 32.1 | 19.3 | 34.3 | 29.2 | 35.1 | 34.3 | 32.8 | 22.7 | 35.7 | 32.2 | 37.9 | 34.3 |
| 8 | 28.2 | 15.1 | 30.0 | 24.3 | 31.2 | 30.3 | 29.2 | 18.3 | 32.1 | 27.2 | 32.9 | 30.9 |
| 9 | 32.1 | 17.1 | 34.2 | 26.3 | 35.2 | 32.6 | 32.8 | 21.2 | 35.8 | 29.5 | 36.3 | 33.4 |
| 10 | 32.2 | 16.7 | 34.4 | 26.7 | 35.3 | 31.3 | 32.7 | 20.5 | 36.5 | 29.8 | 37.3 | 32.2 |
| 11 | 33.8 | 19.2 | 35.8 | 29.2 | 37.2 | 34.6 | 34.8 | 23.3 | 37.3 | 32.2 | 39.9 | 33.6 |
| Conventional | | | | | | | | | | | | |
| 12 | 29.8 | 15.9 | 31.6 | 25.9 | 32.8 | 30.0 | 29.7 | 15.8 | 30.0 | 16.9 | 31.0 | 19.1 |
| 13 | 33.3 | 18.6 | 35.0 | 28.8 | 36.8 | 33.5 | 29.5 | 15.0 | 32.0 | 23.5 | 34.0 | 27.0 |
| 14 | 23.3 | 12.7 | 25.0 | 22.0 | 26.1 | 24.2 | 26.2 | 17.2 | 29.3 | 24.3 | 29.8 | 27.5 |
| 15 | 31.4 | 15.9 | 33.1 | 26.1 | 34.1 | 30.9 | 30.1 | 15.2 | 32.2 | 21.3 | 33.1 | 21.7 |
| 16 | 31.3 | 16.0 | 33.0 | 26.0 | 34.2 | 31.2 | 32.4 | 20.1 | 35.4 | 29.1 | 36.4 | 31.0 |

Figure 4:
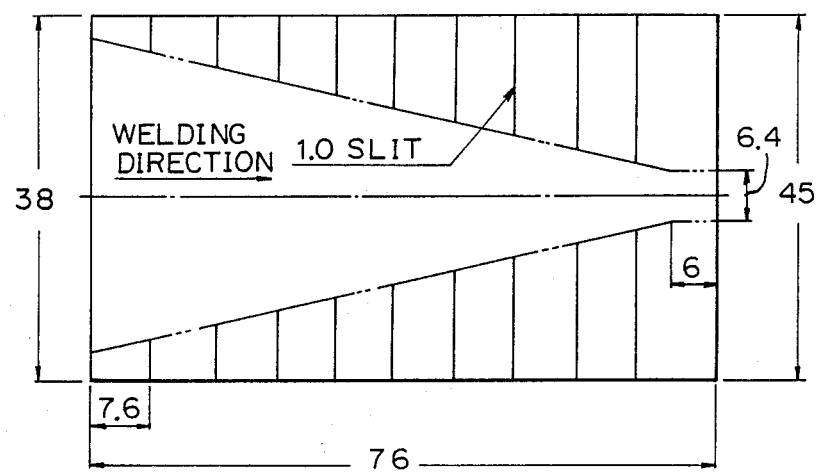
FIG. 4 is a drawing of a fish-bone specimen (unit of the numerals in the drawing is mm).

Fish-bone crack-test specimens were TIG welded to investigate the crack ratio. The TIG welding condition was: autogeneous TIG welding (no filler); current-60 A; advancing speed-25 cm/min; electrode-tungsten electrode 2.4 mm in diameter; Ar-stream; and, arc length-3 mm. The size of a fish bone specimen is shown in FIG. 4.

TABLE 5

| Samples | Weldability Crack ratio |
|---|---|
| Inventive | |
| 1 | 6% |
| 2 | 11% |
| 3 | 8% |
| 4 | 8% |
| 5 | 12% |
| 6 | 11% |
| Comparative | |
| 7 | 17% |
| 8 | 53% |
| 9 | 48% |
| 10 | 52% |
| 11 | 16% |
| Conventional | |
| 12 | 14% |
| 13 | 68% |
| 14 | 57% |
| 15 | 23% |
| 16 | 53% |

The crack ratio herein is expressed by the following formula.

Crack ratio(%)=(length of beads cracked/total length of welding beads)×100

It is apparent that the inventive alloys have improved weldability.

The following facts are clear from the foregoing test results.

The comparative samples Nos. 7 and 9 having low Si and high Mg contents exhibit satisfactory strength but poor formability and rather bad weldability. The comparative sample No. 8 containing Cu exhibits poor corrosion-resistance and weldability. The comparative sample No. 10 having a further lower Si content than the comparative samples Nos. 7 and 9 exhibits poor formability and rather poor post-baking hardenability. The other properties of sample No. 10 are not excellent. The comparative sample No. 11 having a higher Mg content than the comparative samples Nos. 7 and 9 exhibits excellent strength-properties but other properties are poor, particularly formability.

The conventional samples Nos. 13 through 16 are the representative materials for forming. The inventive material is superior to these materials from a view point of the comprehensive properties. More specifically, the inventive material is superior to: 2036 (No. 13) in formability, elongation, bake-hardenability, and weldability; to 6009 (No. 14) in strength and weldability; to No. 15 in bake-hardenability and weldability; and, to 6010 (No. 16) in elongation and weldability.

EXAMPLE 2

With regard to the alloy of Nos. 1, 4, 5 and 6 of Table 1, 4 mm thick hot-rolled sheets were obtained by the same methods as in Example 1 except for the solution heat-treatment described hereinafter. The sheet thickness was further reduced to 3 mm by cold-rolling. When this sheet thickness was obtained, intermediate annealing was carried out at 350° C. for 2 hours, followed by cooling at an average cooling rate of 30° C./Hr. The sheet thickness was subsequently reduced to 1 mm by cold-rolling, followed by coiling. Incidentally, for the comparison purpose, cold-rolled sheets of the alloy of Nos. 1 and 6 were produced by the same methods as described above except that the intermediate annealing was omitted. These coils were heated by means of a continuous solution heat-treating and quenching furnace at a heating rate of 30° C./sec up to 560° C., held for time given in Table 7, and then quenched by forced air at a quenching rate of 30° C./sec. Aging at room temperature was carried out for 2 weeks (T4 temper). The same tests as in Example 1 were then carried out. The bulging test by a ball head 100 mm in diameter was also carried out. The appearance of specimens was observed, and the formability was judged by the following criterion.

◯: no flow line at all
Δ: appreciable flow line (not usable for the applications where the appearance requirement is severe
x : strong flow line The results are shown in Table 6.

able. The flow-line characteristics of the inventive material is improved.

As is described in the foregoing, it is possible to obtain the material having improved strength, formability, weldability, and corrosion-resistance.

EXAMPLE 3

The 1 mm thick rolled sheets of inventive alloys Nos. 1, 2, 3, 4, 5, and 6, comparative alloys Nos. 7, 8, 9, 10 and 11, and conventional alloys Nos. 12, 13, 14, 15, and 16 were cut into sizes of 70 mm × 150 mm.

Test 1: Corrosion Resistance Test of Unpainted Sheets

The surface of rolled sheets were degreased by 10% NaOH solution at 50° C. for 1 minute, rinsed by distilled water, subjected to removal of smut, and then rinsed.

TABLE 6

| | | | Mechanical Properties and Formability | | | | | | | |
|---|---|---|---|---|---|---|---|---|---|---|
| Alloy | Holding Time at Solution Heat Treatment Temperature | Inter- mediate Annealing | Yield Strength ($\sigma_{0.2}$) | Tensile Strength ($\sigma_B$) | Elongation ($\delta$) | Erichsen Value (Er) | Minimum Bending (180°) | Limitative Drawing Ratio (LDR) | Luders Marks | Flow Line |
| 1 | 20 sec | yes | 13.2 | 25.8 | 31 | 9.8 | 2.21 | 0.3 | no | ◯ |
| 1 | 20 sec | no  | 13.3 | 25.9 | 29 | 9.6 | 2.18 | 0.5 | no | Δ |
| 4 | 0 sec  | yes | 14.2 | 25.3 | 32 | 9.8 | 2.18 | 0.3 | no | ◯ |
| 5 | 15 sec | yes | 15.3 | 27.8 | 30 | 9.6 | 2.17 | 0.3 | no | ◯ |
| 6 | 30 sec | yes | 16.3 | 28.8 | 29 | 9.5 | 2.18 | 0.5 | no | ◯ |
| 6 | 30 sec | no  | 15.4 | 27.9 | 29 | 9.4 | 2.17 | 0.5 | no | Δ |

The aluminum-alloy rolled sheets with T4 temper were subjected (without stretching) to aging at 175° C. for 1 hour which corresponded to the paint baking. The strength was then measured. The results are shown in Table 7.

TABLE 7

| Alloy | Holding Time at Solution Heat Treatment | Intermediate Annealing | Tensile Strength ($\sigma_B$) | Yield Strength ($\sigma_{0.2}$) |
|---|---|---|---|---|
| 1 | 20 sec | yes | 26.9 | 14.7 |
| 1 | 20 sec | no  | 27.0 | 15.0 |
| 4 | 0 sec  | yes | 26.8 | 15.3 |
| 5 | 15 sec | yes | 28.1 | 17.2 |
| 6 | 30 sec | yes | 29.4 | 18.3 |
| 6 | 30 sec | no  | 29.0 | 18.0 |

As is apparent from the results of Alloys Nos. 1 and 6 according to the present examples, these alloys exhibit improved properties even in the production of rolled sheets by using a continuous annealing furnace having high productivity. In addition, by means of interposing intermediate annealing the flow line is improved, thereby enhancing the adaptability of inventive rolled sheets to the application, where requirements for appearance is as severe as in automobiles.

The solution heat-treatment at a short holding time, e.g., 15 sec or less, applied for Alloys Nos. 4 and 5, corresponds to an example, by which quantity of Mg and Si necessary for strengthening is redissolved, and the remainder of Mg and Si is undissolved and left as the precipitates. The productivity is extremely enhanced by such solution heat-treatment. The strength of alloys subjected to such solution treatment is somewhat inferior to that of Example 1, but, strength necessary for substituting the steel sheets for automobiles, i.e., 12 kg/mm² or more of yield strength, is obtained. In addition, higher strength than this yield strength can be obtained, because the inventive material is bake-harden- The salt spray test stipulated in JIS Z 2371 was carried out with regard to the rolled sheets treated as described above. The spraying time was 1000 hours. The corrosion-resistance was evaluated by the following criterion.

◉ : no pits at all
◯ : few pits
Δ : considerable number of pits
x : pits over the entire surface

TABLE 8

| Results of Judgement | |
|---|---|
| Inventive Alloys | 1 ◉ |
|  | 2 ◉ |
|  | 3 ◉ |
|  | 4 ◉ |
|  | 5 ◯ |
|  | 6 ◯ |
| Comparative Alloys | 7 ◯ |
|  | 8 Δ x |
|  | 9 Δ |
|  | 10 Δ x |
|  | 11 ◯ |
| Conventional Alloys | 12 ◉ |
|  | 13 x |
|  | 14 Δ |
|  | 15 ◯ |
|  | 16 Δ |

Test 2: The blister and filiform corrosion of painted sheet

The above described cut, rolled sheets were alkaline-degreased, water-rinsed, and then treated by zinc phosphate. After water-rinsing, the so-treated sheets were dried and then subjected to under-coating of epoxy resin by electro-deposition coating to form a 20 μm thick coating, followed by baking at 160° C. for 30 minutes. On this coating was applied melamine alkyd paint to form a 30 μm thick intermediate coating, followed by baking at 140° C. for 25 minutes. Subsequently, melamine alkyd paint was applied to form a 35 μm thick top coating, followed by baking at 145° C. for 25 minutes. The cross cuts were then grooved on the surfaces of every sample. The salt spray test was then carried out for 48 hours in accordance with JIS 2371. The humidity test was then carried out for 30 days at a temperature of 45° C. and humidity of 95%. The blisters and filiform corrosion or rust on the surfaces of samples were evaluated by the following criterion.

TABLE 9

| Judgement Criterion | |
|---|---|
| Blister | filiform corrosion/rust |
| no generation ◎ | 1 mm or less ◎ |
| 3 or less ○ | 1.0–2.0 mm ○ |
| 3–10 △ | 2.0–4.0 mm △ |
| 10 or more x | 4 mm or more x |

The judgement results are shown in Table 10.

TABLE 10

| | Judgement Result | |
|---|---|---|
| Alloys | Blister | Filiform Corrosion/Rust |
| Inventive | | |
| 1 | ○ | ○ |
| 2 | ○ | ○ |
| 3 | ○ | ○ |
| 4 | ○ | ○ |
| 5 | ○ | ○ |
| 6 | ○ | ○ |
| Comparative | | |
| 7 | ○ | ○ |
| 8 | x | x |
| 9 | x | △ |
| 10 | x | x |
| 11 | ○ | ○ |
| Conventional | | |
| 12 | ◎ | ○ |
| 13 | x | x |
| 14 | △ | △ |
| 15 | ◎ | ○ |
| 16 | △ | △ |

EXAMPLE 4

The Al alloy melts having the compositions of Table 11 were cast by semi-continous casting (DC casting) into slabs, 50 mm × 1000 mm in cross section, at a casting speed of 60 mm/min. mm/min.

TABLE 11

| Alloys | Composition (%) | | | | | | | | | |
|---|---|---|---|---|---|---|---|---|---|---|
| | Si | Mg | Cu | Fe | Mn | Cr | Zr | Zn | Ti | B |
| 17 | 2.10 | 0.32 | Tr | 0.15 | 0.07 | — | — | — | 0.01 | 0.0001 |
| 18* | 1.35 | 0.90 | 0.35 | 0.20 | 0.05 | — | — | — | 0.01 | 0.0002 |
| 19+ | 0.86 | 0.85 | 0.30 | 0.22 | 0.24 | — | — | — | 0.03 | 0.0002 |

*Comparative
+Conventional alloy is 6010

Subsequently, the homogenizing was carried out at 530° C. for 10 hours and hot-rolling to reduce sheet thickness to 4 mm was carried out. The sheet thickness was further reduced to 3 mm by cold-rolling. When this sheet thickness was obtained, intermediate annealing was carried out at 350° C. for 2 hours, followed by cooling at an average cooling rate of 30° C./Hr. The sheet thickness was further reduced to 1 mm and the obtained sheets were coiled. These coils were solution heat-treated at 530° C. for 15 minutes and water-quenched at an average cooling rate of 1000° C./sec. The solution heat-treated, cut sheets were exposed in the ambient temperature for 2 weeks and then subjected to distortion-straightening and correction of sheet-flattening by stretching. The final heat treatment was then carried out under the conditions given in Table 20.

TABLE 20

| | Conditions of Final Heat Treatment | | | |
|---|---|---|---|---|
| Conditions | Heating Rate (°C./sec) | Temperature (°C.) | Holding Time (sec) | Cooling Rate (°C./sec) |
| Inventive | | | | |
| A | 2 | 200 | 50 | $10^2$ |
| B | $8 \times 10^{-3}$ | 100 | 7200 | $1.5 \times 10^{-2}$ |
| Comparative | | | | |
| C | $8 \times 10^{-3}$ | 200 | 50 | $10^3$ |
| D | 2 | 100 | 50 | $10^3$ |
| E | 20 | 200 | 3600 | $10^3$ |
| F | 2 | 200 | 20 | $10^{-2}$ |
| G | 20 | 300 | 0 | $10^3$ |

The mechanical properties, Erichsen value and deformation of sheets prior and subsequent to the stretching are shown in Table 21.

TABLE 21

| | | | Mechanical Properties and Erichsen Value | | | | | | | |
|---|---|---|---|---|---|---|---|---|---|---|
| | | | Before Stretching (1 week after quenching) | | | | After Stretching (*) | | | |
| Sample | Alloy | Method | Tensile Strength ($\sigma_B$) | Yield Strength ($\sigma_B$) | Elongation ($\delta$) | Erichsen Value (Er) | Tensile Strength ($\sigma_B$) | Yield Strength ($\sigma_B$) | Elongation ($\delta$) | Erichsen Value (Er) |
| Inventive | | | | | | | | | | |
| (a) | 17 | A | 26.2 | 13.5 | 30 | 9.7 | 27.4 | 16.2 | 27 | 8.9 |
| (b) | 17 | B | 26.2 | 13.5 | 30 | 9.7 | 27.4 | 16.2 | 27 | 8.9 |
| Comparative | | | | | | | | | | |
| (c) | 18 | A | 32.1 | 17.1 | 29 | 9.3 | 32.4 | 19.7 | 27 | 8.9 |
| Conventional | | | | | | | | | | |
| (d) | 19 | A | 31.3 | 16.0 | 27 | 9.0 | 31.5 | 22.0 | 25 | 8.7 |
| (e) | 19 | B | 31.3 | 16.0 | 27 | 9.0 | 31.5 | 22.0 | 25 | 8.7 |
| Comparative | | | | | | | | | | |
| (f) | 17 | C | 30.8 | 15.3 | 29 | 9.2 | 31.4 | 18.3 | 27 | 8.9 |
| (g) | 17 | D | 30.8 | 15.3 | 29 | 9.2 | 31.4 | 18.3 | 27 | 8.9 |
| (h) | 17 | E | 30.8 | 15.3 | 29 | 9.2 | 31.4 | 18.3 | 27 | 8.9 |
| (i) | 17 | F | 30.8 | 15.3 | 29 | 9.2 | 31.4 | 18.3 | 27 | 8.9 |

TABLE 21-continued

| Sample | Alloy | Method | Mechanical Properties and Erichsen Value | | | | | | | |
|---|---|---|---|---|---|---|---|---|---|---|
| | | | Before Stretching (1 week after quenching) | | | | After Stretching (*) | | | |
| | | | Tensile Strength ($\sigma_B$) | Yield Strength ($\sigma_B$) | Elongation ($\delta$) | Erichsen Value (Er) | Tensile Strength ($\sigma_B$) | Yield Strength ($\sigma_B$) | Elongation ($\delta$) | Erichsen Value (Er) |
| (j) | 17 | G | 30.8 | 15.3 | 29 | 9.2 | 31.4 | 18.3 | 27 | 8.9 |

Remarks
(*): The values are those obtained one week after 1% Stretching.

The mechanical properties, Erichsen value and distortion of sheets after the final heat treatment are shown in Table 22.

TABLE 22

| Samples | Mechanical Properties, Erichsen Value and Distortion of Sheets after Final Treatment | | | | |
|---|---|---|---|---|---|
| | Tensile Strength ($\sigma_B$) | Yield Strength ($\sigma_{0.2}$) | Elongation ($\delta$) | Erichsen Value (Er) | Distortion (+) |
| Inventive | | | | | |
| (a) | 26.0 | 12.8 | 31 | 9.8 | ○ |
| (b) | 27.5 | 15.7 | 30 | 9.6 | ○ |
| Comparative | | | | | |
| (c) | 31.0 | 17.2 | 29 | 9.4 | ○ |
| Conventional | | | | | |
| (d) | 30.9 | 16.2 | 29 | 9.2 | ○ |
| (e) | 31.6 | 18.9 | 30 | 9.1 | ○ |
| Comparative | | | | | |
| (f) | 31.4 | 21.8 | 22 | 7.3 | ○ |
| (g) | 31.4 | 18.0 | 27 | 8.9 | ○ |
| (h) | 32.3 | 23.0 | 19 | 6.8 | ○ |
| (i) | 31.1 | 18.3 | 23 | 7.1 | ○ |
| (j) | 30.3 | 16.0 | 30 | 9.5 | x |

Remarks(+): Distortion appreciable by the naked eye is denoted by x, while non-appreciable distortion is denoted by ○.

When the inventive alloy No. 17 was finally annealed under the inventive conditions A and B, the formability reduced due to stretching was restored to the level before stretching. On the other hand, when the inventive alloy was finally annealed under the conditions outside the inventive range, the formability was not restored or was rather reduced. Under Condition G, the formability was restored but the distortion again generated by the final heat treatment and hence the effects of distortion-straightening disappeared.

EXAMPLE 5

Alloy No. 17 was subjected to the same process as in Example 1 to produce a 1 mm thick cold-rolled coil. This coil was subjected to continuous solution heat-treatment and quenching treatment, in which the solution temperature was 560° C., temperature-elevating rate was approximately 30° C./sec, holding was not carried out at the solution heat-temperature, and cooling was forced air cooling at cooling rate of approximately 30° C./sec. Since the as-quenched sheets were so heavily deformed to the extent that they were unsuited as the commercial products, the distortion was straightened by tension levelling. These sheets were finally annealed under the conditions of: heating rate-20° C./sec; holding temperature-210° C.; holding time-20 sec; and, cooling rate-20° C./sec. The properties of sheets were shown in Table 23.

TABLE 23

| Properties | Properties of Sheet | | | |
|---|---|---|---|---|
| | Tensile Strength ($\sigma_B$) | Yield Strength ($\sigma_{0.2}$) | Elongation ($\delta$) | Erichsen Value (Er) |
| 2 weeks after quenching | 24.4 | 12.2 | 32 | 9.8 |
| After levelling | 25.1 | 14.3 | 28 | 9.2 |
| After final heat treatment | 24.6 | 12.0 | 32 | 10.0 |
| Distortion of final sheet | ○ | | | |
| Bending radius (180°) | 0.3 mm | | | |
| luder's line | no | | | |
| Flow line | ○ | | | |

The as-T₄ tempered sheets (not stretched) were subjected to aging at 175° C. for 1 hour, which corresponded to paint baking, so as to investigate the bake hardenability. The results are shown in the following table.

TABLE 24

| Bake Hardenability | | | | | | | |
|---|---|---|---|---|---|---|---|
| Before Aging | | | | After Aging | | | |
| Before Stretching | | After 2% Stretching | | No Stretching | | After 2% Stretching | |
| TS | YS | TS | YS | TS | YS | TS | YS |
| 24.6 | 12.0 | 25.9 | 17.3 | 26.3 | 18.4 | 28.0 | 25.0 |

Remarks:
TS = tensile strength;
YS = (0.2%) yield strength

Regarding the finally heat-treated material, the salt-spray test and judgement were carried out by the same methods as in Example 3, except that the spraying time was one month. The SST judgement obtained was ◎. In addition, with regard to the finally heat-treated material, the fish bone test was carried out by the same method as in Example 1. The crack ratio obtained was 11%.

EXAMPLE 6

The 1 mm thick rolled sheets of the inventive alloy No. 17 (the final annealing condition-A and B), comparative alloy No. 18 (final annealing condition-B), and conventional alloy No. 19 were cut into specimens of corrosion-resistance 70 mm×150 mm in size.

Test 1: Corrosion-resistance of unpainted sheets-the same as in Example 3

The results are shown in Table 25.

TABLE 25

| | Corrosion-resistance of unpainted sheets | | |
|---|---|---|---|
| Sample | Alloy | Method | SST evaluation |
| Inventive | | | |
| (a) | 17 | A | ◎ |
| (b) | 17 | B | ◎ |
| Comparative | | | |
| (c) | 17 | C | ◎ |
| (d) | 17 | D | ◎ |
| (e) | 17 | E | ○ |

Test 2: Post-painting Blister and Filiform Corrosion/rust

The same as in Example 3
The test results are shown in Table 26.

TABLE 26

| | Corrosion-resistance of painted sheets | | | |
|---|---|---|---|---|
| Sample | Alloy | Final Heat-Treatment | Blister | Filiform rust |
| Inventive | | | | |
| (a) | 17 | A | ○ | ○ |
| (b) | 17 | B | ○ | ○ |
| Comparative | | | | |
| (c) | 18 | A | △ | △ |
| Conventional | | | | |
| (d) | 19 | A | △ | △ |
| (e) | 19 | B | X | X |

From the foregoing results, it is apparent that the corrosion-resistance of unpainted and painted sheets obtained by the present invention are superior to those of comparative and conventional sheets.

EXAMPLE 7

The Al alloy melts having the compositions of Table 27 were cast by semi-continuous casting (DC casting) into slabs, 500×1000 mm in cross section, at a casting speed of 60 mm/min.

The slabs were subjected to homogenizing given in Table 28, followed by hot-rolling to a thickness of 4 mm, and further cold-rolling to obtain 1 mm thick rolled sheets. Finally, the heat treatment given in Table 28 was carried out.

TABLE 28

| | Heat Treatment | |
|---|---|---|
| | Homogenizing | Final Heat Treatment |
| Inventive | | |
| 20 | 530° C. × 10 Hr | 530° C. × 15 min, water quenching |
| 21 | 530° C. × 10 Hr | 530° C. × 15 min, water quenching |
| 22 | 530° C. × 10 Hr. | 530° C. × 15 min, water quenching |
| Comparative | | |
| 23 | 530° C. × 10 Hr. | 530° C. × 15 min, water quenching |
| 24 | 530° C. × 10 Hr. | 530° C. × 15 min, water quenching |
| 25 | 530° C. × 10 Hr. | 530° C. × 15 min, water quenching |
| Conventional | | |
| 26 | 530° C. × 10 Hr. | 350° C. × 2 Hr, slow cooling (annealed, 0 temper) |
| 27 | 530° C. × 10 Hr. | 500° C. × 15 min, water quenching |
| 28 | 530° C. × 10 Hr. | 530° C. × 15 min, water quenching |
| 29 | 530° C. × 10 Hr. | 530° C. × 15 min, water quenching |

Remarks:
The cooling rate at the water quenching was approximately 1000° C./sec.

The mechanical properties and formability of the alloys, which were finally heat treated as given in Table 28 and then exposed at room temperature for 7 days, are shown in Table 29.

In order to investigate the strength-change of the above described room-temperature aged sheets, during the paint baking after forming, the sheets were subjected to cold working at a degree of 5% and 10%, which corresponded to the forming, and further to heat treatment at 175° C. for 1 hour, which corresponded to paint baking. The strength-change during paint baking for the sheets not cold-worked (working degree of 0%) was also invesitigated by the above method. The results are shown in Table 30.

TABLE 27

| | Alloy Composition | | | | | | | | | |
|---|---|---|---|---|---|---|---|---|---|---|
| Alloy No. | Si | Mg | Cu | Fe | Mn | Zn | Cr | Zr | Ti | B |
| Inventive | | | | | | | | | | |
| 20 | 1.35 | 0.73 | 0.02 | 0.17 | 0.05 | — | 0.05 | — | 0.01 | — |
| 21 | 1.50 | 0.90 | Tr | 0.20 | — | — | 0.11 | — | 0.02 | 0.0002 |
| 22 | 1.70 | 0.92 | 0.05 | 0.15 | — | — | — | 0.05 | 0.01 | 0.0001 |
| Comparative | | | | | | | | | | |
| 23 | 1.35 | 0.90 | 0.35 | 0.20 | 0.05 | — | — | — | 0.01 | 0.0002 |
| 24 | 0.72 | 0.92 | 0.50 | 0.20 | — | — | 0.07 | — | 0.01 | 0.0002 |
| 25 | 1.35 | 1.51 | Tr | 0.20 | — | — | 0.09 | — | 0.01 | 0.0002 |
| Conventional | | | | | | | | | | |
| 26 | 0.09 | 4.53 | 0.03 | 0.21 | 0.35 | — | — | — | 0.02 | 0.0003 |
| 27 | 0.30 | 0.35 | 2.31 | 0.20 | 0.24 | — | — | — | 0.02 | 0.0005 |
| 28 | 0.86 | 0.85 | 0.29 | 0.20 | 0.24 | — | — | — | 0.03 | 0.0002 |
| 29 | 0.09 | 4.45 | 0.20 | 0.17 | 0.10 | 1.43 | — | — | 0.01 | 0.0002 |

Remarks:
No. 26 = 5182, No. 27 = 2036, No. 28 = 6010, and No. 29 = Al—Mg—Zn—Cu

TABLE 29

| Samples | Mechanical Properties and Formability | | | | | | |
| --- | --- | --- | --- | --- | --- | --- | --- |
| | Yield Strength ($\sigma_{0.2}$) | Tensile Strength ($\sigma_B$) | Elongation ($\delta$) | Erichsen Value (Er) | Minimum Bending (180°) | Limitative Drawing Ratio (LDR) | Luders Marks |
| Inventive | | | | | | | |
| 20 | 15.0 | 30.5 | 29 | 9.2 | 0.7 | 2.15 | no |
| 21 | 16.0 | 31.8 | 29 | 9.0 | 0.7 | 2.18 | no |
| 22 | 16.2 | 31.5 | 29 | 9.2 | 0.7 | 2.18 | no |
| Comparative | | | | | | | |
| 23 | 17.1 | 32.1 | 29 | 9.3 | 0.7 | 2.15 | no |
| 24 | 16.7 | 32.2 | 27 | 8.9 | 1.2 | 2.15 | no |
| 25 | 19.2 | 33.8 | 26 | 8.5 | 1.5 | 2.01 | no |
| Conventional | | | | | | | |
| 26 | 14.5 | 29.8 | 28 | 9.5 | 0.5 | 2.19 | yes |
| 27 | 18.6 | 33.3 | 25 | 8.7 | 1.0 | 2.11 | no |
| 28 | 16.0 | 31.3 | 27 | 9.0 | 0.7 | 2.17 | no |
| 29 | 15.9 | 31.4 | 29 | 9.3 | 0.5 | 2.14 | no |

TABLE 30

| | Bake Hardenability | | | | | | | | | | | |
| --- | --- | --- | --- | --- | --- | --- | --- | --- | --- | --- | --- | --- |
| | Pre-working Strength | | Post cold-working (simulated forming) strength | | | | Post heat-treatment (175° C. × 1 Hr, simulated paint baking) strength | | | | | |
| Samples | Tensile Strength 0% | Yield Strength 0% | Tensile Strength 5% | Yield Strength 5% | Tensile Strength 10% | Yield Strength 10% | Tensile Strength 0% | Yield Strength 0% | Tensile Strength 5% | Yield Strength 5% | Tensile Strength 10% | Yield Strength 10% |
| Inventive | | | | | | | | | | | | |
| 20 | 30.5 | 15.0 | 32.6 | 25.5 | 33.0 | 29.7 | 31.5 | 18.7 | 34.7 | 28.3 | 34.8 | 29.9 |
| 21 | 31.8 | 16.0 | 33.6 | 26.0 | 34.5 | 31.0 | 32.4 | 20.0 | 35.5 | 28.8 | 36.0 | 31.1 |
| 22 | 31.5 | 16.2 | 33.8 | 26.3 | 34.0 | 31.2 | 32.3 | 20.5 | 35.8 | 29.5 | 36.4 | 31.1 |
| Comparative | | | | | | | | | | | | |
| 23 | 32.1 | 17.1 | 34.2 | 26.3 | 35.2 | 32.6 | 32.8 | 21.2 | 35.8 | 29.5 | 36.3 | 33.4 |
| 24 | 32.2 | 16.7 | 34.4 | 26.7 | 35.3 | 31.3 | 33.3 | 20.5 | 36.5 | 29.8 | 37.3 | 32.2 |
| 25 | 33.8 | 19.2 | 35.8 | 29.2 | 37.2 | 34.6 | 35.3 | 23.3 | 37.3 | 29.8 | 39.9 | 33.6 |
| Conventional | | | | | | | | | | | | |
| 26 | 29.8 | 14.5 | 31.6 | 25.9 | 32.8 | 30.0 | 29.7 | 15.8 | 30.0 | 16.9 | 31.0 | 19.1 |
| 27 | 33.3 | 18.6 | 35.0 | 28.8 | 36.8 | 33.5 | 29.5 | 15.0 | 32.0 | 23.5 | 34.0 | 27.0 |
| 28 | 31.3 | 16.0 | 33.0 | 26.0 | 34.2 | 31.2 | 32.4 | 20.1 | 35.4 | 29.1 | 36.4 | 31.0 |
| 29 | 31.4 | 15.9 | 33.1 | 26.1 | 34.1 | 30.9 | 30.1 | 15.2 | 32.2 | 21.3 | 33.1 | 21.7 |

As is apparent from Table 29, the inventive alloys Nos. 20 through 29 exhibit improved formability. That is, the inventive alloys have improved bulging and bending properties and do not cause Lüder's marks during forming. As is apparent from Table 30, during the paint-baking process subsequent to cold-working the strength of inventive alloys increases, so that the tensile strength of the finally paint-baked product is as high as 33 kg/mm² or more.

In addition, the fish-bone crack test specimens were TIG welded to investigate the crack ratio. The TIG welding conditions were the same as in Example 1.

TABLE 31

| Weldability | |
| --- | --- |
| Samples | Crack ratio |
| Inventive | |
| 20 | 12% |
| 21 | 14% |
| 22 | 11% |
| Comparative | |
| 23 | 48% |
| 24 | 52% |
| 25 | 16% |
| Conventional | |

TABLE 31-continued

| Weldability | |
| --- | --- |
| Samples | Crack ratio |
| 26 | 14% |
| 27 | 68% |
| 28 | 53% |
| 29 | 23% |

It is apparent that the inventive alloys have improved weldability.

The following facts are clear from the above experimental results.

The comparative sample No. 24 having low Si and high Mg contents exhibit satisfactory strength but poor formability and rather bad weldability. The comparative samples 23 and 24 containing high Cu exhibit poor corrosion-resistance and weldability. The conventional samples Nos. 26 through 29 are the representative materials for forming. The inventive material is superior to these materials from a view point of the comprehensive properties. More specifically, the inventive material is superior to: 2036 (No.27) in formability, elongation, bake-hardenability, and weldability; to Al-Mg-Zn-Cu (No. 29) in bake-hardenability and weldability; and, to 6010 (No.28) in elongation and weldability.

EXAMPLE 8

With regard to the alloy of Nos. 20, 21, and 22 of Table 27, 4 mm thick hot-rolled sheets were obtained by the same methods as in Example 7 except for the solution treatment described hereinafter. The sheet thickness was further reduced to 3 mm by cold-rolling. When this sheet thickness was obtained, intermediate annealing was carried out at 350° C. for 2 hours, followed by cooling at an average cooling rate of 30° C./Hr. The sheet thickness was subsequently reduced to 1 mm by cold-rolling, followed by coiling. Incidentally, for the comparison purpose, cold-rolled sheets of the alloy of No. 24 were produced by the same methods as described above except that the intermediate annealing was omitted. These coils were heated by means of a continuous heat-solution and quenching furnace at a heating rate of 30° C./sec up to 560° C., held for the time given in Table 32, and then quenched at a quenching rate of 30° C./sec. Aging at room temperature was carried out for 2 weeks ($T_4$ temper). The same tests as in Example 1 were then carried out. The bulging test by a ball head 100 mm in diameter was also carried out. The appearance of specimens was observed, and the formability was judged by the following criterion.

○ : no flow line at all
△: appreciable flow line (not usable for the applications where the appearance requirement is severe
X: strong flow line The results are shown in Table 32.

TABLE 32

| Alloy | Holding Time at Solution Heat Treatment Temperature | Intermediate Annealing | Yield Strength ($\sigma_{0.2}$) | Tensile Strength ($\sigma_B$) | Elongation ($\delta$) | Erichsen Value (Er) | Minimum Bending (180°) | Limitative Drawing Ratio (LDR) | Luders Marks | Flow Line |
|---|---|---|---|---|---|---|---|---|---|---|
| 20 | 0 sec | yes | 14.0 | 25.0 | 32 | 9.8 | 2.18 | 0.3 | no | |
| 21 | 15 sec | yes | 15.1 | 27.5 | 30 | 9.6 | 2.17 | 0.3 | no | |
| 22 | 30 sec | yes | 15.5 | 28.0 | 29 | 9.5 | 2.18 | 0.5 | no | |
| 23 | 30 sec | no | 15.1 | 27.5 | 29 | 9.4 | 2.17 | 0.5 | no | △ |

The aluminum-alloy rolled sheets with $T_4$ temper were subjected (without stretching) to aging at 175° C. for 1 hour, which corresponded to the paint baking. The strength was then measured. The results are shown in Table 33.

TABLE 33

| Alloys | Intermediate Annealing | Post-baking Strength (175° C. × 1 Hr) Tensile Strength ($\sigma_B$) | Yield Strength ($\sigma_{0.2}$) |
|---|---|---|---|
| 20 | yes | 26.4 | 15.5 |
| 21 | yes | 28.9 | 17.9 |
| 22 | yes | 29.1 | 18.8 |
| 23 | no | 28.8 | 18.9 |

As is apparent from the results of Alloy No. 22 (Table 33) according to the present examples, this alloy exhibits improved properties even in the production of rolled sheets by using a continuous annealing furnace having high productivity. In addition, by means of interposing intermediate annealing the flow line is improved, thereby enhancing the adaptability of inventive rolled sheets to the application, where requirements for appearance is as severe as automobiles.

The solution heat-treatment at a short holding time applied for Alloys Nos. 20 and 21, corresponds to an example, by which a quantity of Mg and Si necessary for strengthening is redissolved, and the remainder of Mg and Si is undissolved and left as the precipitates. The productivity is extremely enhanced by such solution treatment. The strength of alloys subjected to such solution treatment is somewhat inferior to that of Example 7, but, strength necessary for substituting the steel sheets for automobiles, i.e., 12 kg/mm² or more of yield strength, is obtained. In addition, higher strength than this yield strength can be obtained, because the inventive material is bake-hardenable. The flow-line characteristics of the inventive material is improved. As is described above, it is possible to obtain the material having improved strength, formability, weldability, and corrosion-resistance.

EXAMPLE 9

The 1 mm thick rolled sheets of inventive alloys Nos. 20, 21, and 22, comparative alloys Nos. 23, 24, and 25, and conventional alloys Nos. 26, 27, 28, and 29 were cut into 70 mm × 150 mm sizes.

Test 1: Corrosion Resistance Test of Unpainted Sheets

The same as in Example 3

TABLE 34

| Results of SST Judgement | | |
|---|---|---|
| Inventive Alloys | 20 | ◎ |
|  | 21 | ◎ |
|  | 22 | ◎ |
| Comparative Alloys | 23 | △ |
|  | 24 | △X |
|  | 25 | ◎ |
| Conventional Alloys | 26 | ◎ |
|  | 27 | X |
|  | 28 | △ |
|  | 29 | ○ |

Test 2: The Blister and Filiform Corrosion of Painted Sheet

The same as in Example 3

The judgement results are shown in Table 35.

TABLE 35

| Alloys | Judgement Result Blister | Filiform Corrosion/Rust |
|---|---|---|
| Inventive | | |
| 20 | ◎ | ◎ |
| 21 | ◎ | ◎ |
| 22 | ◎ | ○ |
| Comparative | | |
| 23 | X | △ |
| 24 | X | X |
| 25 | ◎ | ◎ |
| Conventional | | |

TABLE 35-continued

| Alloys | Judgement Result Blister | Filiform Corrosion/Rust |
|---|---|---|
| 26 | O | O |
| 27 | X | X |
| 28 | Δ | Δ |
| 29 | O | O |

EXAMPLE 10

The inventive alloy No. 20 was subjected to the process including the intermediate annealing and continuous solution and quenching as in Example 8. The conditions of intermediate annealing were: temperature-elevating rate—30° C./sec; quenching rate—30° C./sec; annealing temperature—560° C.; and, holding-no-holding The solution-treated sheets were exposed in the ambient temperature for 2 weeks and then subjected to distortion-straightening and correction of sheet-flatness by tension-levelling. The final heat treatment was then carried out under the conditions given in Table 36.

TABLE 36

| Conditions | Conditions of Final Heat Treatment | | | |
|---|---|---|---|---|
| | Heating Rate (°C./sec) | Temperature (°C.) | Holding Time (sec) | Cooling Rate (°C./sec) |
| Inventive | | | | |
| A | 2 | 200 | 50 | $10^3$ |
| B | $8 \times 10^{-3}$ | 100 | 7200 | $1.5 \times 10^{-2}$ |
| Comparative | | | | |
| C | $8 \times 10^{-3}$ | 200 | 50 | $10^3$ |
| D | 2 | 100 | 50 | $10^3$ |
| E | 20 | 200 | 3600 | $10^3$ |
| F | 2 | 200 | 20 | $10^{-2}$ |
| G | 20 | 300 | 0 | $10^3$ |

The mechanical properties, Erichsen value and distortion of sheets prior and subsequent to the stretching are shown in Table 37.

TABLE 37

| | Mechanical Properties, Erichsen Value, and Distortion of Sheets | | | | | | | | | | | | Distortion of Final Sheet |
|---|---|---|---|---|---|---|---|---|---|---|---|---|---|
| | Before Levelling ($T_4$) | | | | After Levelling | | | | After Final Heat Treatment | | | | |
| Condition | Tensile Strength ($\sigma_B$) | Yield Strength ($\sigma_{0.2}$) | Elongation (δ) | Erichsen Value (Er) | Tensile Strength ($\sigma_B$) | Yield Strength ($\sigma_{0.2}$) | Elongation (δ) | Erichsen Value (Er) | Tensile Strength ($\sigma_B$) | Yield Strength ($\sigma_{0.2}$) | Elongation (δ) | Erichsen Value (Er) | |
| A | 25.5 | 14.0 | 32 | 9.8 | 25.2 | 16.5 | 28 | 9.2 | 25.2 | 13.8 | 32 | 10.0 | O |
| B | | | | | | | | | 25.8 | 6.4 | 32 | 9.9 | O |
| C | | | | | | | | | 27.3 | 19.0 | 26 | 7.0 | O |
| D | | | | | | | | | 25.3 | 16.4 | 29 | 9.3 | O |
| E | | | | | | | | | 28.6 | 20.1 | 22 | 7.1 | O |
| F | | | | | | | | | 27.1 | 19.1 | 21 | 6.9 | O |
| G | | | | | | | | | 25.0 | 13.9 | 32 | 10.0 | X |

As is apparent from Table 38, the elongation and Erichsen values are reduced, that is, the formability is reduced, after levelling, as compared with those under the $T_4$ temper. Under the conditions A, and B, where the final heat treatment is carried out within the inventive condition, the elongation and Erichsen values are virtually equal to those under the $T_4$ temper. It is therefore clear that the formability is satisfactorily restored by the final heat treatment. Under each inventive Condition A, or B, such distortion as to impair flatness of sheets was not generated.

Condition C corresponds to an example, where the heating rate is too slow. In this case, the formability was impaired but final heat treatment as compared with that after levelling. Condition D corresponds to an example, where the holding time at the given holding temperature is too short. In this case, the formability was not restored to that attained under $T_4$ temper, but was restored only slightly. Condition E corresponds to an example, where the holding time in the final heat treatment is too long. In this case, the formability was seriously impaired by the final heat treatment. Condition F corresponds to an example, where the cooling rate in the final heat treatment is too slow. In this case, the formability was also reduced by final heat treatment. Condition G corresponds to an example, where the cooling rate is too rapid. In this case, the formability was restored but the distortion was caused to impair the flatness. It is therefore necessary to maintain the conditions of final heat treatment within the inventive range, in order to restore the formability to that under $T_4$ temper state, while retaining the flatness-enhancing effects due to stretching.

As is apparent from the examples, the aluminum-alloy rolled sheet according to the present invention has improved formability, i.e., improved bulging and bending properties and also has high strength. Particularly, the aluminum-alloy rolled sheet according to the present invention can provide paint-baked product having high final strength attained by the strength-increase during paint-baking process. The most pertinent application of aluminum-alloy rolled sheet according to the present invention is therefore body sheets of an automobile, which are welded, painted and baked.

In addition, the aluminum-alloy rolled sheet according to the present invention has improved corrosion-resistance, TIG and MIG weldability.

Since the main components of aluminum-alloy rolled sheet according to the present invention are only Mg and Si, which are most frequently used as the main components in the ordinary rolled sheets, extruded products, and casting, the scraps of aluminum alloys can easily be used as scraps for melting the inventive alloy. The inventive alloy can also be easily used for melting the alloys of casting and the like. The aluminum-alloy rolled sheet according to the present invention is therefore advantageous in the light of treatment of scraps.

The aluminum-alloy rolled sheet according to the present invention can also be used for the formed products where the strength is required, such as: automobile parts, e.g., a wheel, an oil-tank, and, air-cleaner; various caps and blinds; aluminum-cans; household articles; cover of measuring instruments; and chassis of electric appliances.

We claim:

1. An Al-Si-Mg series aluminum-alloy rolled sheet (for forming, having improved formability, corrosion-resistance, and weldability, consisting) essentially of Si and Mg, whose contents are on and within the line connecting points A, B, C, D, E, and F of FIG. 1, except for the line DEFAB, from 0.05 to 0.5% of Fe, and balance aluminum and unavoidable impurities, with the proviso that:

|    | Si (%) | Mg (%) |
|----|--------|--------|
| A: | 1.8    | 0.1    |
| B: | 2.5    | 0.1    |
| C: | 2.5    | 1.1    |
| D: | 1.2    | 1.1    |
| E: | 1.2    | 0.6    |
| F: | 1.8    | 0.6    |

2. An Al-Si-Mg series aluminum-alloy rolled sheet for forming, having improved formability, corrosion-resistance, and weldability, according to claim 1, wherein at least one element selected from the group consisting of not more than 0.6% of Mn, not more than 0.3% of Cr, and not more than 0.3% of Zr is contained.

3. An Al-Si-Mg series aluminum-alloy rolled sheet for forming, having improved formability, corrosion-resistance, and weldability, according to claim 1 or 2, wherein the Si content is at least 1.8%.

4. A production method for an Al-Si-Mg series aluminum-alloy rolled sheet for forming, having improved formability, corrosion-resistance, and weldability, comprising the steps of:
preparing melt consisting essentially of Si and Mg, whose contents are on and within the line connecting points A, B, C, D, E, and F of FIG. 1, except for the line FA, from 0.05 to 0.5% of Fe, and balance aluminum and unavoidable impurities, with the proviso of

|    | Si (%) | Mg (%) |
|----|--------|--------|
| A: | 1.8    | 0.1    |
| B: | 2.5    | 0.1    |
| C: | 2.5    | 1.1    |
| D: | 1.2    | 1.1    |
| E: | 1.2    | 0.6    |
| F: | 1.8    | 0.6    | casting the melt by continuous or semi-continuous casting to form an ingot;
rolling the ingot to form a rolled sheet; and,
solution heat-treating the rolled sheet at a temperature ranging from 450° to 590° C., followed by cooling at a cooling rate of not less than 5° C./sec.

5. A method according to claim 4, further comprising the steps of:
heating the semi-continuously cast ingot at temperature ranging from 450° to 590° C. for 1 to 48 hours, thereby homogenizing the ingot and heating to the ingot for hot rolling; and,
subsequently, hot-rolling the ingot.

6. A method according to claim 4, wherein the ingot in the form of a coil is formed by continuous casting, and, further the rolling is carried out by cold-rolling, comprising the step of:
heating the ingot at a temperature ranging from 300° to 590° C. for 1 to 48 hours, thereby homogenizing the ingot.

7. A method according to claim 4, 5, or 6, further comprising the step of:
intermediate annealing directly after the hot-rolling or between steps of cold-rolling at a holding temperature ranging from 260° to 450° C. for not more than 48 hours,
and, wherein the solution heat-treatment is carried out after the cold-rolling.

8. A method according to claim 4, 5, or 6, wherein the solution heat-treatment is carried out by means of a continuous solution and quenching furnace at a holding time of from 0 to 5 seconds.

9. A method according to claim 4, 5, or 6, further comprising the steps of:
distortion-straightening the rolled sheet after solution heat-treatment; and,
final heat-treating, in which the temperature is elevated up to a temperature of from 60° to 360° C. at a temperature-elevating rate falling within the hatched region of FIG. 2, said temperature is held for a time within the hatched region of FIG. 3, and, subsequently cooling is carried out at a cooling rate falling within the hatched region of FIG. 3.

10. A method according to claim 4, 5, or 6, wherein the melt further contains at least one element selected from the group consisting of not more than 0.6% of Mn, not more than 0.3% of Cr, and not more than 0.3% of Zr is contained.

11. A method according to claim 10, further comprising the step of:
intermediate annealing directly after the hot-rolling or between steps of cold-rolling at a holding temperature ranging from 260° to 450° C. for not more than 48 hours,
and, wherein the solution heat-treatment is carried out after the cold-rolling.

12. A method according to claim 10, wherein the solution heat-treatment is carried out by means of a continuous solution and quenching furnace at a holding time of from 0 to 5 seconds.

13. A method according to claim 10, further comprising the steps of:
distortion-straightening the rolled sheet after solution-treatment; and,
final heat-treating, in which the temperature is elevated up to a temperature of from 60° to 360° C. at a temperature-elevating rate falling within the hatched region of FIG. 2, said temperature is held for a time within the hatched region of FIG. 3, and, subsequently cooling is carried out at a cooling rate falling within the hatched region of FIG. 3.

* * * * *